United States Patent [19]

Hirano

[11] 4,388,975
[45] Jun. 21, 1983

[54] COMBINATION WEIGHING DEVICE

[75] Inventor: Takashi Hirano, Kobe, Japan

[73] Assignee: Yamato Scale Company, Ltd., Hyogo, Japan

[21] Appl. No.: 262,927

[22] Filed: May 12, 1981

[30] Foreign Application Priority Data

May 13, 1980 [JP] Japan ................................. 55-63132

[51] Int. Cl.³ .......................... G01G 19/04; B07C 5/16
[52] U.S. Cl. ..................................... 177/25; 209/592; 364/567
[58] Field of Search ...................... 177/25, 1; 209/592; 364/567

[56] References Cited

U.S. PATENT DOCUMENTS 4,267,894  5/1981  Hirano et al. .......................... 177/25
4,336,852  6/1982  Hirano .................................. 177/25

Primary Examiner—George H. Miller, Jr.
Attorney, Agent, or Firm—Eugene E. Geoffrey, Jr.

[57] ABSTRACT

A combination weighing device which is typically used for packing a plurality of solid articles in each package, including a plurality of weighing balances for simultaneously weighing each of a plurality of articles, and arithmetic means for selecting some of these weighing balances so that the total weight of the articles thereon falls within a predetermined range, the device also including means for causing a specified one or more of the weighing balances to enter always into the selected combination, thereby ensuring that each package contains the articles from the specified weighing balance.

4 Claims, 4 Drawing Figures

COMBINATION WEIGHING DEVICE

This invention relates to a novel and improved combination weighting device.

The weighing device which is generally referred to as a "combination balance" or "combination weighing device" is used for extracting a plurality of articles from a group of articles, such as candies, fruits and vegetables, having relatively large variances in respective weights, to form a sub-group having a weight approximating a predetermined intended weight which will be hereinunder referred to as the "reference weight". An example of such a device is disclosed in U.S. Pat. No. 3,939,928 and another example is described in the published British patent specification No. GB2039374A. In these devices, a plurality of articles are weighed individually by a plurality of weighing devices at the same time, all mathematical combinations of the respective weights are summed respectively and the sum is compared with a predetermined range of weight about the reference weight. Thus, the combination providing a sum falling within this range is selected.

In case of forming packages each containing several kinds of candies, for example, it is sometimes requested that each package contain one or more specific kinds of candies. The prior art combination weighing devices are unusuable for such purpose since the weighing balances which will enter the selected combination are unpredictable.

Accordingly, an object of this invention is to provide a combination weighing device including a weighing balance or weighing balances which can always enter the respective combinations, and, therefore, usable for the above purpose.

According to this invention, a combination weighing device is provided, which includes a plurality of weighing balances generating electric signals indicative of their measured weights, respectively, an arithmetic unit having a plurality of inputs corresponding to these weighing balances and producing an output when the sum of the received input signals is within a predetermined range, a plurality of normally-open switches coupled between the weighing balances and the arithmetic unit inputs each provided with a control terminal, a switch control unit having a plurality of outputs coupled respectively to the control terminals of the normally-open switches and producing control signals from its outputs selected successively according to predetermined combinations, and means coupled to the switch control unit and the arithmetic unit for providing a combination of the control signals to associated devices of the corresponding weighing balances in response to the output of the arithmetic unit. According to a feature of this invention, the combination weighing device further includes means for always supplying the output signal or signals from a selected one or more of the weighing balances to the arithmetic unit regardless of the outputs of the switch control unit.

These and other objects and features of this invention will be described hereinunder with reference to the accompanying drawings.

IN THE DRAWINGS

Throughout the drawings, like reference numerals are used to denote like structural components.

Figure 1:
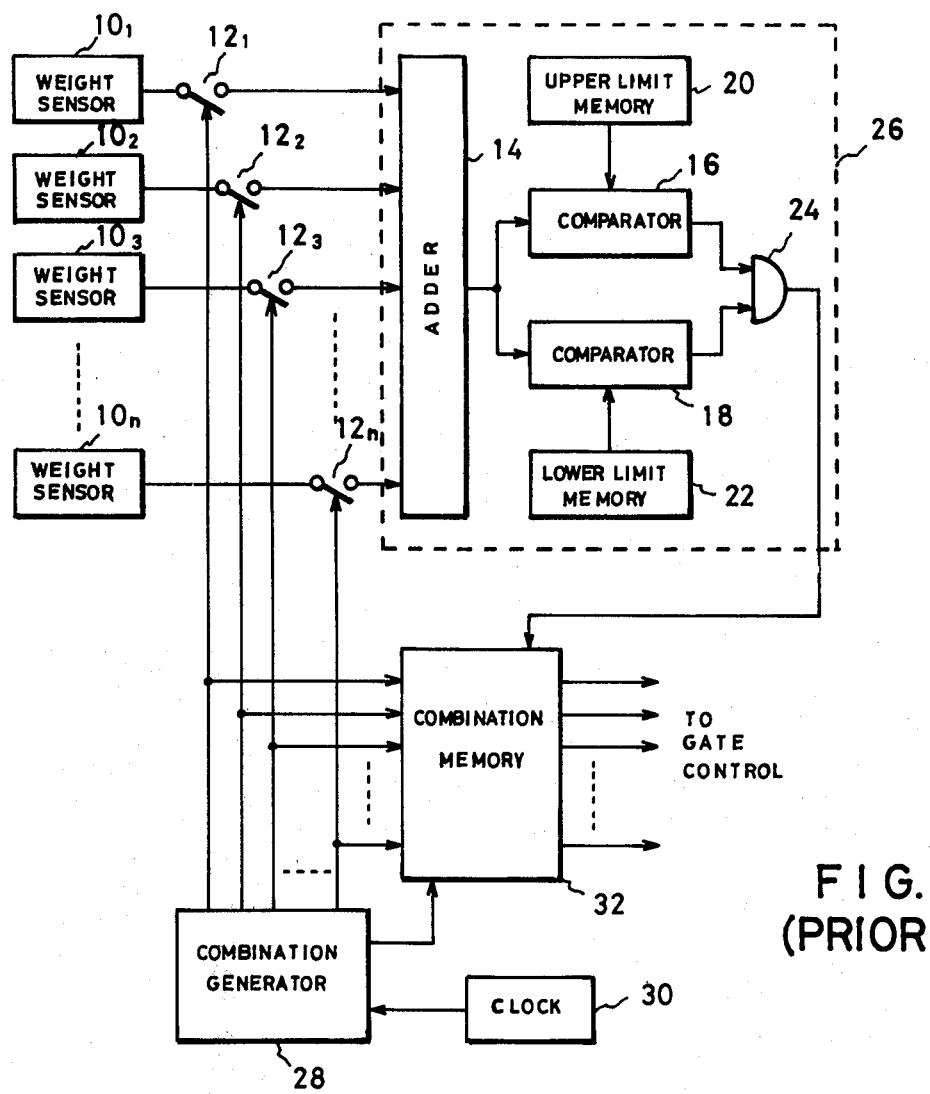
FIG. 1 is a block diagram representing a typical configuration of a data processing arrangement of a prior art combination weighing device.

Referring to FIG. 1, the prior art arrangement of a combination weighing device includes a plurality of weight sensors $10_1, 10_2, \ldots 10_n$, such as load cells, for sensing the weights of articles carried on a plurality of corresponding weighing balances (not shown), respectively, to produce weight signals indicative of the respective weights. These weight signals are coupled respectively through normally-open switches $12_1, 12_2, \ldots 12_n$, each having a control input, to an adder circuit 14 which sums the input weight signals to produce a sum output.

The sum output of the adder circuit 14 is applied to an upper limit comparator 16 and to a lower limit comparator 18. The comparators 16 and 18 have their second inputs coupled respectively to the outputs of upper and lower limit memories 20 and 22. The upper and lower limit memories 20 and 22, each having an input device such as conventional digital keyboard (not shown), stored predetermined upper and lower limits of the allowable range of the weight of combined articles, respectively. The comparators 16 and 18 compare the sum output with these upper and lower limits and produce outputs at the same time when the sum falls within the allowable range. These outputs are applied to a pair of inputs of an AND circuit 24 to cause it to apply a command signal to a combination memory 32 which will be described later. The circuit including the above mentioned components 14 through 24 surrounded by a dashed block 26 will be referred to hereinunder as the "judging circuit".

The control input or terminal of each normally-open switch 12 is coupled to a corresponding one of n-number of output terminals of a combination generator 28. The combination gernerator 28 is driven by a train of clock pulses from a clock pulse generator 30 to produce a predetermined set of combinations of output signals for its selected output terminals successively. For example, if the predetermined set of combinations are complete mathematical combinations of the n-number of outputs, the combination generator 28 may be an n-bit binary counter having a control input coupled to the clock pulse generator 30 and n-number of parallel bit outputs coupled respectively to its output terminals. In this case, the "output signal" from each output terminal of the combination generator 28 may correspond to logic "1". As well-known by those skilled in the art, the total number of such combinations is $2^n-1$ and, therefore, the combination generator 28 will produce $(2^n-1)$ sets of output signals successively from the corresponding output terminals in synchronism with the applied clock pulses, thereby controlling the corresponding switches 12.

The combination memory 32 has a plurality (n-number) of input terminals coupled respectively to the corresponding output terminals of the combination generator 28, and the same number of corresponding output terminals coupled respectively to gate control arrangements (not shown) associated with the corresponding weighing balances (not shown). The combination memory 32 serves to store a set of incoming signals in response to the command signal from the judging circuit 26 and discharge them from the corresponding output terminals in response to a signal supplied from the combination generator 28 at the end of each combination cycle, thereby unloading the corresponding weighing balances. Such combination memories can be designed easily by those skilled in the art and will not be described further.

Figure 2:
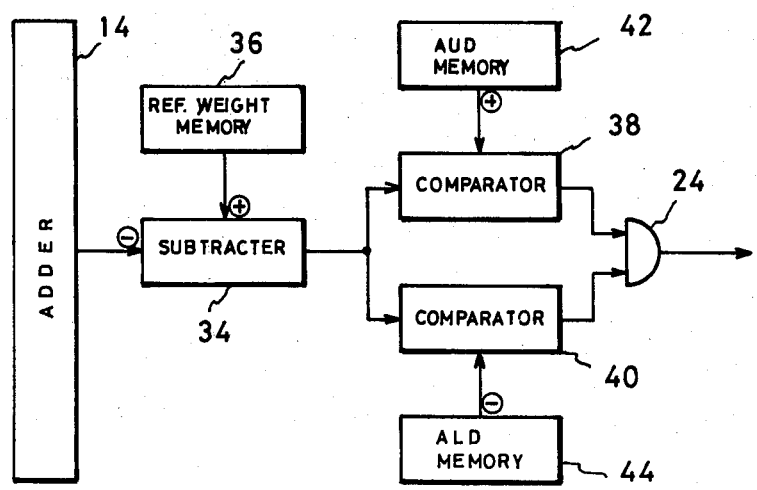
FIG. 2 is a block diagram representing a typical alternative configuration of the judging circuit of FIG. 1.

Referring to FIG. 2 showing another type of prior art judging circuit 26, the aforementioned sum output of the adder circuit 14 is applied to a subtracter circuit 34 another input of which is coupled to a reference weight memory 36 which stores a predetermined "reference weight". The subtracter 34 subtracts the sum from the adder 14 from the "reference weight" from the memory 36 to produce a deviation signal indicative of the deviation of the combined weight from the intended "reference weight". It should be noted that the output of the subtractor 34 may be of positive or negative value and the subsequent arithmetic operation is executed taking the sign (plus or minus) into consideration. The deviation output of the subtracter 34 is applied to a pair of comparators 38 and 40 each having another input coupled respectively to the allowable upper deviation (AUD) memory 42 and the allowable lower deviation (ALD) memory 44 which are basically the same in structure as the memories 20, 22 and 36 and store predetermined allowable upper and lower deviations from the "reference weight", respectively. It is to be noted, in this case, that the content of the AUD memory 42 is always positive (plus), while that of the ALD memory 44 is always negative (minus). The comparator 38 compares the output from the subtracter 34 with the content of the AUD memory 42 and produces an output when the former is less than the latter, while the comparator 40 compares the output of the subtracter 34 with the content of the ALD memory 44 and produces an output when the former is greater than the latter. The outputs of the comparators 38 and 40 are coupled to an AND circuit 24 which produces a command signal when the deviation falls between the allowable upper and lower deviations.

In a modification of the above-described prior art system, the deviation output of the subtracter 34 is stored in a memory and compared with subsequent deviation outputs. If the subsequent deviations are less than the content of the memory, the memory is updated every time and, at the same time, the combination memory 32 is also updated, thereby causing the combination memory 32 to discharge the combined outputs corresponding to the least deviation in every cycle of the combination.

Although the above-described arrangements are essential to the combination weighing device, no further description will be made since they have no direct connection to the present invention.

Figure 3:
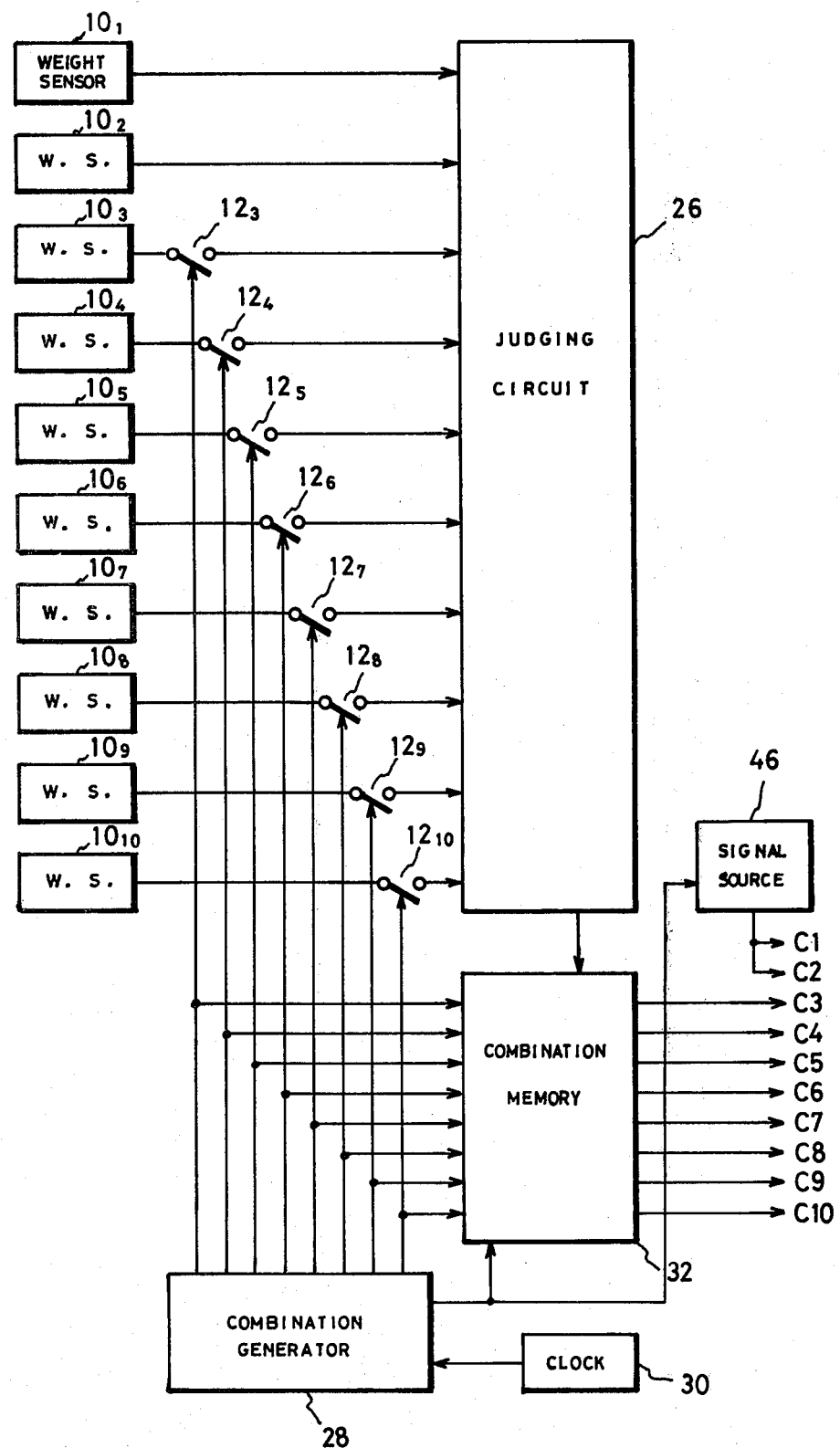
FIG. 3 is a block diagram representing an embodiment of circuit configuration of the combination weighing device according to this invention.

Referring now to FIG. 3, showing an embodiment of a combination weighing device according to this invention. This arrangement is similar to that shown in FIG. 1, except that the first and second weight sensors $10_1$ and $10_2$ are coupled directly to the judging circuit 26 while the other weight sensors $10_3$ through $10_{10}$ are coupled through normally-open switches $12_3$ through $12_{10}$, respectively, and a separate signal source 46 is added. The signal source 46 is arranged to produce control signals C1 and C2, which are to be used for loading and unloading of the weighing balances having the weight sensors $10_1$ and $10_2$, respectively, in time with the outputs C3 through C10 of the combination memory 32 used for the other weighing balances, in response to the reset signal from the combination generator 28.

Operation of the present embodiment is self-explanatory from the description of the arrangement of FIG. 1, and it is understood that the weight signals from the weight sensors $10_1$ and $10_2$ can participate always in the combination. Thus, if the weighing balances having the weight sensors $10_1$ and $10_2$ are used for specific kinds of articles, these kinds of articles will surely be included in every combination and, therefore, in every package.

Figure 4:
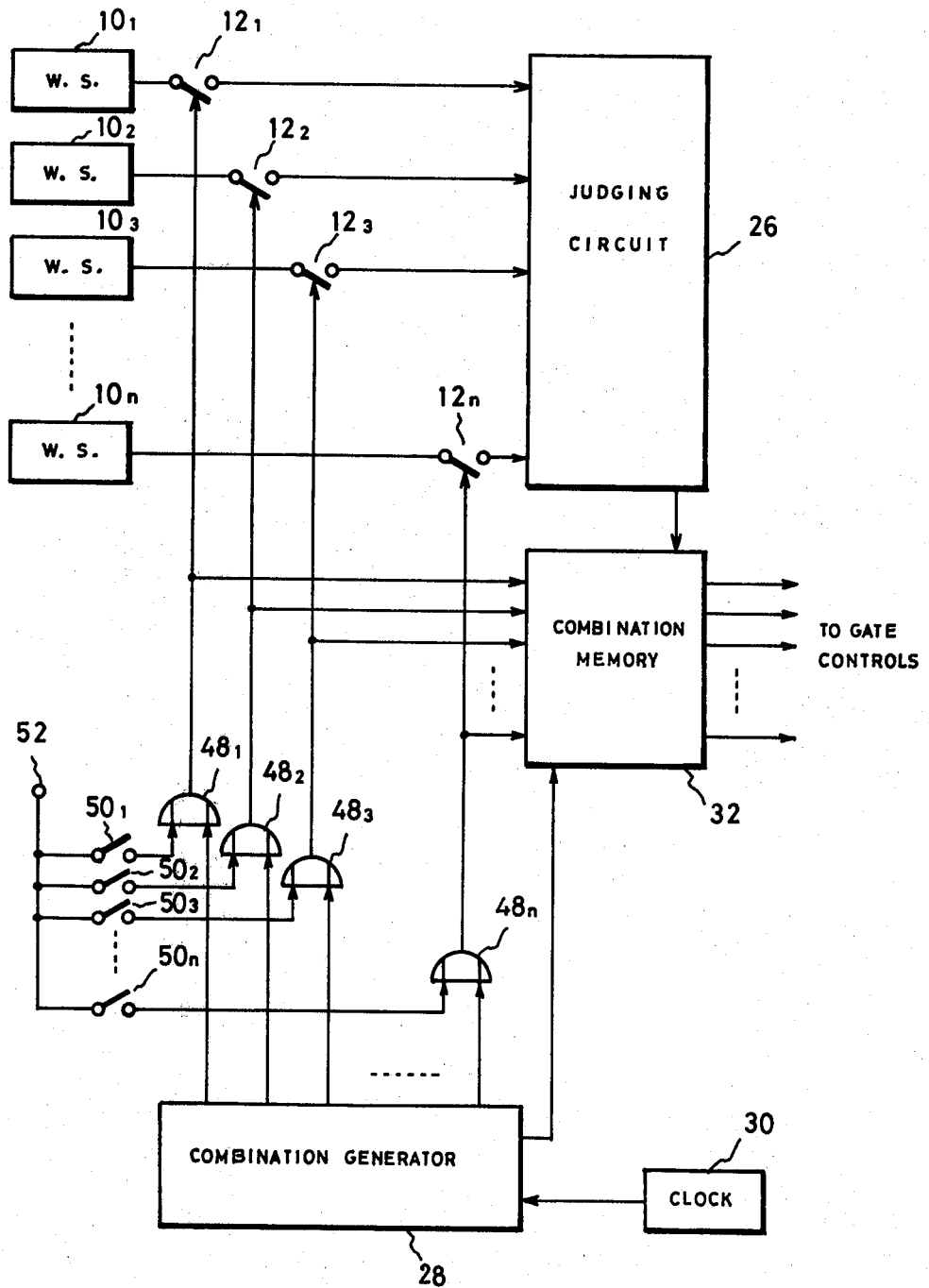
FIG. 4 is a block diagram representing another embodiment according to this invention.

Referring next to FIG. 4, showing another embodiment of this invention, this arrangement is also similar to that of FIG. 1 but OR circuits $48_1, 48_2, \ldots 48_n$ are inserted between the combination generator 28 and the normally-open switches 12, respectively, such that the first inputs of the OR circuits are supplied from the corresponding output terminals of the combination generator and the outputs of the OR circuits are coupled respectively to the corresponding normally-open switches and to the corresponding inputs of the combination memory 32. The second inputs of the OR circuits $48_1, 48_2, \ldots 48_n$ are coupled through normally-open switches $50_1, 50_2, \ldots 50_n$, respectively, to a common potential source 52 for providing voltage level sufficient to close the normally-open switches 12.

Operation of this embodiment will be also self-explanatory. When an arbitrarily selected one of the normally-open switches 50 (e.g. $50_3$) is closed manually, the potential level at the supply terminal 52 is applied through this switch and the corresponding OR circuit (e.g. $48_3$) to the control terminal of the corresponding normally-open switch (e.g. $12_3$) and to the corresponding input of the combination memory 32, thereby allowing the weight signal from the corresponding weight sensor (e.g. $10_3$) to participate always in the combination. Thus, in this embodiment, an arbitrary one or more weighing balance or balances can be directed always to the combination by merely closing a corresponding one or more of the normally-open switches 50.

Though the invention has been described in conjunction with only two embodiments, it should be noted that various modifications and changes can be made by those skilled in the art without departing from the true scope of this invention defined in the appended claims.

What is claimed is:

1. A combination weighing device, comprising a plurality of weighing balances for producing electric signals indicative of their measured weights, respectively; an arithmetic unit having a plurality of inputs for summing the incoming signals to produce an output when the resultant sum falls within a predetermined range; a plurality of normally-open switches coupled respectively between said weighing balances and the inputs of said arithmetic unit and having a control terminal each; switch control means having a plurality of output terminals coupled respectively to the control terminals of said normally-open switches for applying control signals thereto from the output terminals selected successively in accordance with predetermined combinations; and means coupled to said switch control means and said arithmetic unit for supplying a combination of said control signals to associated equipments of corresponding ones of said weighing balances in response to the output of said arithmetic unit; and means for always supplying the output signal or signals of at least a predetermined one or more of said weighing balances to said arithmetic unit.

2. A combination weighing device, according to claim 1, wherein the last said means include means for coupling said predetermined one or more of said weighing balances directly to the corresponding input or inputs of said arithmetic unit independently of said normally-open switches.

3. A combination weighing device, according to claim 1, wherein the last said means includes means for always supplying a control signal or control signals to a predetermined one or more of said normally-open switches independently of the outputs of said switch controls means.

4. A combination weighing device, according to claim 3, wherein said control signal supplying means include a plurality of OR circuits each having one input coupled respectively to an output of said switch control means and an output coupled respectively to the control terminal of the associated normally-open switch, and a plurality of second normally-open switches each coupled respectively to another input of one of said OR circuits for selectively supplying a signal or signals to close said predetermined normally-open switch or switches independently of said switch control means.

* * * * *